Figure 1:
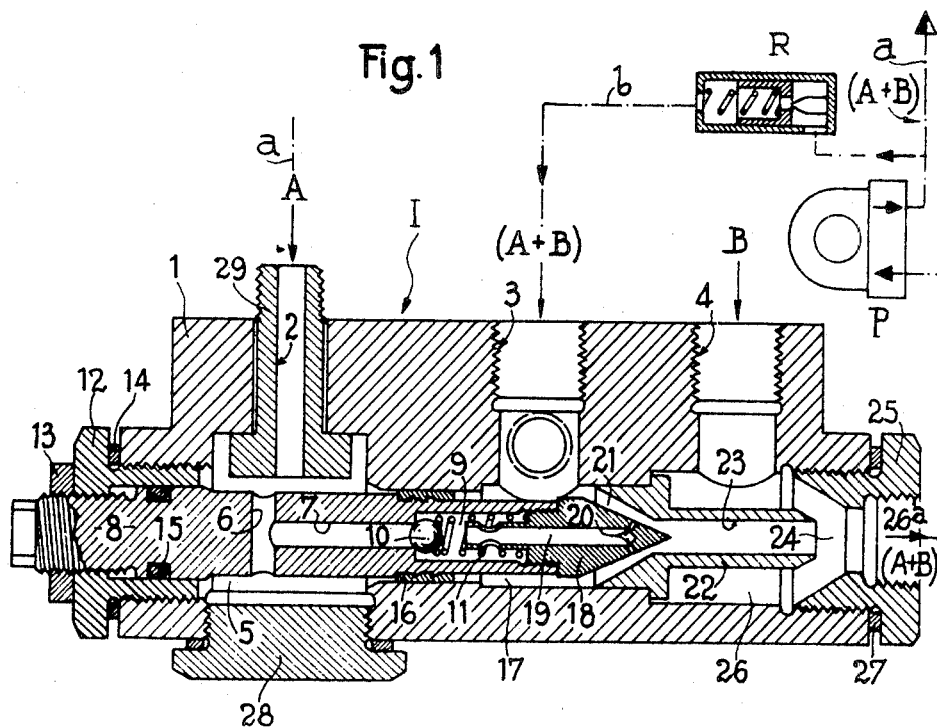

United States Patent
Laveau

[15] 3,648,714
[45] Mar. 14, 1972

[54] PROCESS AND APPARATUS FOR AUTOMATICALLY CONTROLLING A MIXTURE OF TWO FLUIDS

[72] Inventor: Francis Laveau, Bondy, France
[73] Assignee: Elf Union, Paris, France
[22] Filed: Oct. 22, 1970
[21] Appl. No.: 82,968

[30] Foreign Application Priority Data
Nov. 5, 1969 France .................................. 6938011

[52] U.S. Cl. .................................. 137/7, 137/88, 137/115, 137/604
[51] Int. Cl. .......................................................... F16k 19/00
[58] Field of Search .......................... 137/88, 7, 116, 604, 115

[56] References Cited

UNITED STATES PATENTS 2,675,820  4/1954  Harrison ................................. 137/88
3,171,427  3/1965  McAlpine ........................... 137/604 X

FOREIGN PATENTS OR APPLICATIONS 855,656  11/1952  Germany ............................... 137/604

Primary Examiner—Robert G. Nilson
Attorney—John Lezdey

[57] ABSTRACT

Process and apparatus for metering and mixing a fluid A and a fluid B under pressure and supplying the mixture to a positive displacement pump provided with a pressure limiter. The fluid A is injected under pressure in a fraction of the mixture (A+B) coming from the exhaust of the pressure limiter. The variations of the mixture (A+B) from the pressure limiter act as counterpressure on the injection of the fluid A which ensures the constancy of the proportionalities of the two fluids in the final mixture (A+B), which is obtained by the injection of the mixture A+(A+B) in the supply of the fluid B, irrespective of the flow of utilization of the final mixture.

9 Claims, 4 Drawing Figures

PROCESS AND APPARATUS FOR AUTOMATICALLY CONTROLLING A MIXTURE OF TWO FLUIDS

Many industrial, household or agricultural systems employ mixtures of fluids or more often emulsions of two nonmiscible fluids, which are supplied to the system of utilization by a high-pressure or medium-pressure positive displacement pump, whereas the amount of emulsion in fact utilized varies constantly. This is the case in liquid fuel burner systems for example.

Known processes for producing a stable emulsion are efficient, but the homogeneity and the ratio of the relative percentages of the two fluids of the emulsion depend on the quality of the previously formed mixture employed.

A system effecting this mixture must therefore achieve the following:
  a strictly precise metering of one or each of the fluids;
  an intimate and homogeneous mixture of the two fluids;
  regulation of the metering to ensure that the proportions of the two fluids remain constant irrespective of the flow of the mixture.

To perform these operations, it is known to utilize the small pressure variations produced at the inlet of the pump by the modulations of the utilization flow, this being achieved by means of a static or mechanical mixing device connected downstream of a constriction placed in each supply conduit of the two fluids, which are moreover maintained at constant very similar pressures. As the desired metering or dosage is achieved by regulation of the sections of the constrictions, pressure variations at the inlet of the pump are transmitted equally to the two fluids whose flow rates vary in proportion.

This method has several drawbacks:
  large pressure drops occur at the inlet of the pump;
  the slightest pressure variation of either of the fluids modifies the proportions of the mixture;
  to ensure the dosage or proportions, there is employed the direct action of a very small pressure variation (positive or negative), whence the necessity of a very fine regulation and the use of high-precision pressure regulators.

Further, an installation for obtaining an improved dosage or metering which could be constructed from various conventional or specialized apparatuses in the form of a complete regulation system might give full satisfaction, but the complexity, size and cost would be out of proportion with the contemplated application.

The object of the present invention is to overcome these drawbacks and to provide a process which permits, by means of a static apparatus in one unit which performs the double function of a mixing device and a metering device which controls the proportions of the two fluids, supplying a constant-flow displacement pump with two nonmiscible fluids in accordance with a homogeneous mixture having a constant and regulable proportion, irrespective of the flow rate of utilization, there being returned to said static apparatus the mixture which has not been employed and whose flow rate is essentially variable.

The invention provides a process of automatically metering or dosing a mixture of a first fluid A and a second fluid B to be supplied to a positive displacement pump provided with a pressure limiter, comprising injecting the first fluid A at pressure in a fraction of the mixture (A+B) which comes from the discharge of said pressure limiter and whose flow rate variations, which are complementary to the flow variations of utilization, produce pressure variations which act as counterpressure on the injection of the fluid A, whereby it is possible to ensure the constancy of the percentages of the two fluids A and B in the final mixture (A+B) irrespective of the flow of utilization of said final mixture.

The pressure variations of the fluid mixture (A+B) which is a function of the flow of utilization act as a counterpressure on the injector of the fluid and produce flow variations of the fluid A in accordance with the flow-pressure curve of its injector. Moreover, the fluid B maintained at constant pressure is normally supplied to the pump after having been mixed with the fluid A + A+B).

The regulation of the magnitude of the pressure variations of the fluid (A+B) by the axial position of the injector of the fluid A, the regulation of the pressure of the fluid A and the choice of the flow-pressure characteristics of its injector make it possible to obtain, depending on the requirements of the system, either a perfect constancy of the proportions of the fluids A and B irrespective of the flow of utilization of the mixture (A+B), or an evolution of the proportions as a function of the utilized flow of said mixture.

Another object of the invention is to provide an automatically controlled metering and mixing apparatus for carrying out the process defined hereinbefore. This apparatus comprises three chambers provided with three inlets respectively for the first fluid A, the mixture (A+B) at variable pressure coming from the pressure limiter, and a second fluid B, and two injectors for injecting respectively the first fluid A into a convergent frustoconical stream of said mixture of fluids (A+B) at the outlet of the second chamber and the obtained mixture A+(A+B) into a convergent stream of the second fluid B at the outlet of the third chamber.

According to other features:
  the injector of the first fluid A is removable, interchangeable and integral with an axial screthread whereby it is possible to modify its position with respect to the body of the apparatus and thus define the outlet section of the variable-pressure second chamber;
  the injector of the first fluid A is provided with a check valve;
  a cylindrical hollow member mounted inside the body is provided with ports respectively facing the fluid inlets and carrying all the fluid injection means.

Further features and advantages of the invention will be apparent from the ensuing description with reference to the accompanying drawings.

Figure 2:
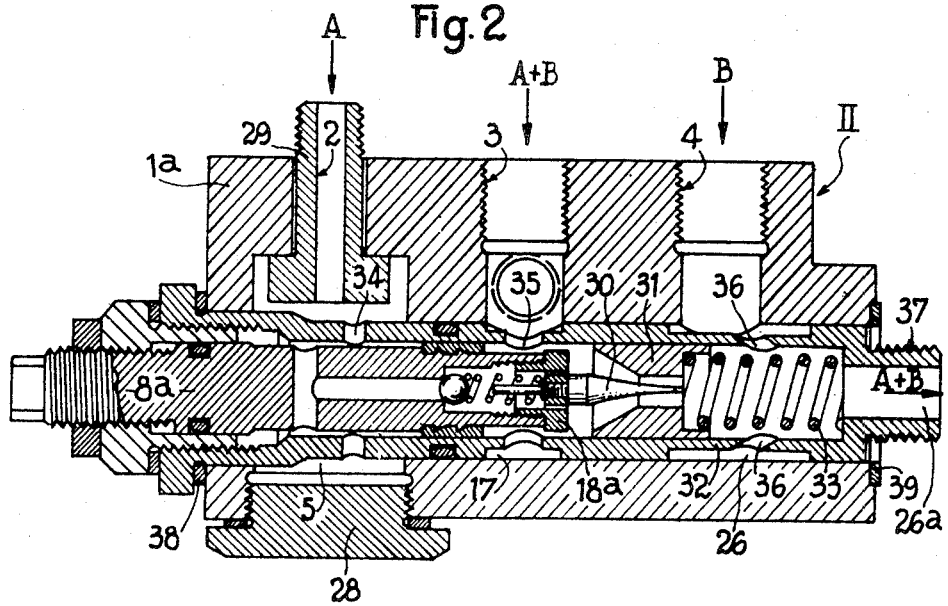
Figure 3:
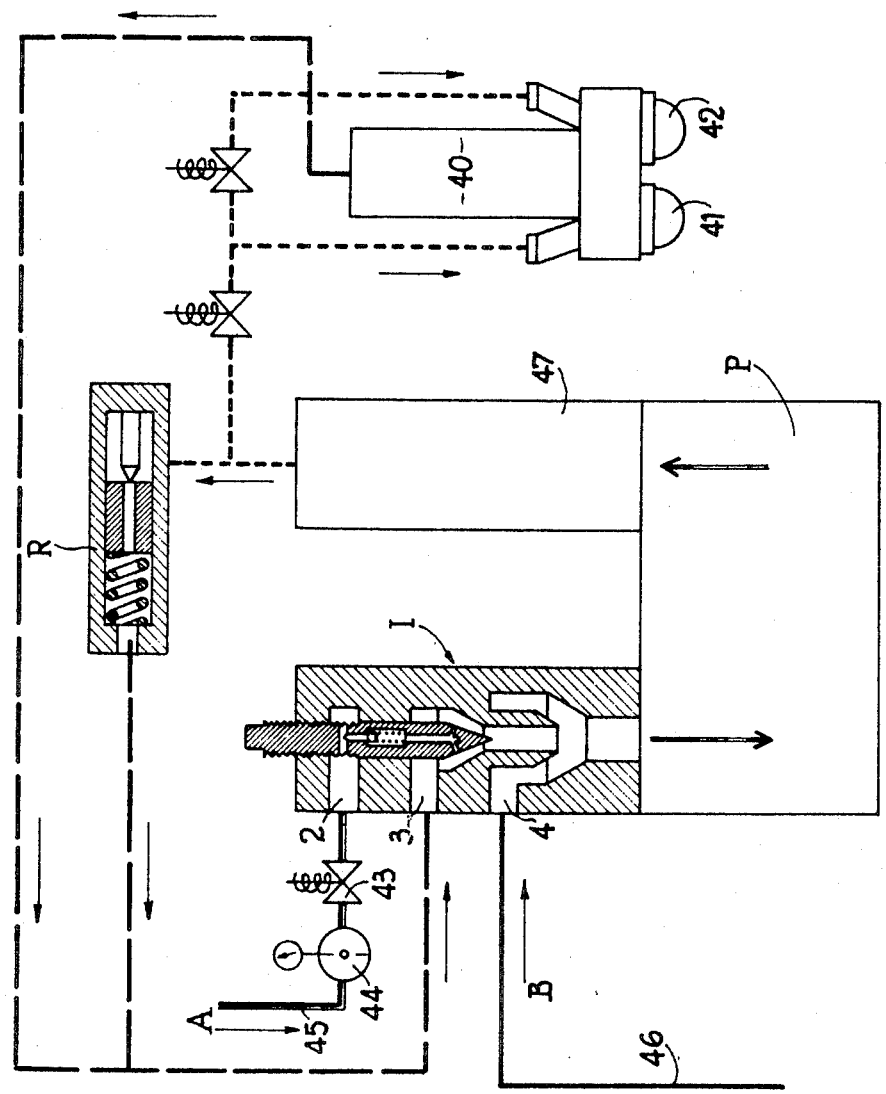
Figure 4:
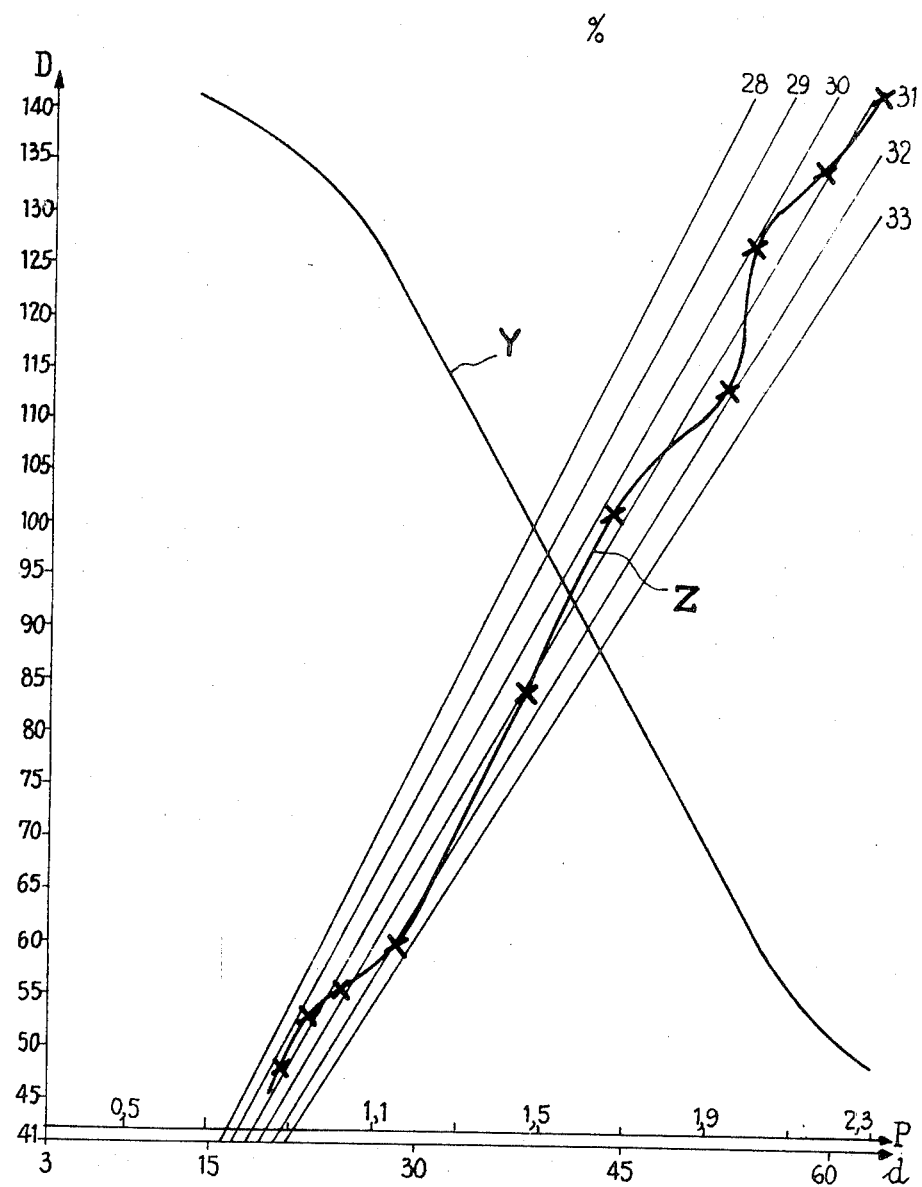

In the drawings:
  FIG. 1 is a sectional view of an automatically regulated metering-mixing apparatus according to the invention;
  FIG. 2 is a sectional view of a modification of the apparatus according to the invention;
  FIG. 3 is a circuit diagram showing the apparatus according to the invention employed for a liquid fuel burner, and
  FIG. 4 is a chart representing by points X, found experimentally, the variation in the flow rate $d$ of the fluid A (water) plotted as abscissae as a function of variation in the flow rate D, that is, the consumption of the fluid B (fuel oil) plotted as ordinates, the curve Y representing the corresponding variation in the return pressure P of the fluid A+B (emulsion) as a function of D, these values being obtained by adapting the apparatus shown in FIG. 1 in accordance with the diagram shown in FIG. 3.

In the embodiment shown in FIG. 1, the body 1 of the apparatus I comprise three fluid inlets 2, 3 and 4.

The inlet 2 opens into a chamber 5 which communicates with a second axial chamber 9 by way of a radial passage 6 and an axial passage 7 of an injector carrier 8. A ball 10 is maintained applied against the outlet of the passage 7 by a spring 11. The injector carrier 8 is longitudinally adjustable by screwing the carrier with respect to a nut 12 screw-threadedly engaged in the body 1. A locknut 13 locks the carrier 8 in the adjusted position but allows the injector carrier assembly to be removed. Indeed, to achieve this, it is merely necessary to unscrew the nut 12 without altering the adjustment. A copper sealing ring 14 and a toric ring 15 afford a seal between the chamber 5 and the exterior, a "TEFLON" ring 16 affords a seal between the chamber 5 and an annular chamber 17 surrounding an axial injector 18.

The axial injector 18 comprises an axial blind passage 19 which communicates with a conical passage 21 by way of calibrated orifices 20. The conical passage 21 is formed between the male conical head of the injector and the female conical face of a guide nozzle 22. The conical passage 21 communicates in the upstream direction, that is, towards the left as viewed in FIG. 1, with the annular chamber 17 (with which communicates the radially extending second inlet 3) and in the downstream direction with an axial passage 23 of the guide nozzle 22.

The passage 23 communicates at the downstream end thereof with the frustoconical inlet 24 of a convergent nozzle 25 which communicates at the upstream end thereof with a third axial chamber 26 (with which communicates the third radially extending inlet 4) which is extended in the downstream direction by a screw-threaded outlet connection 26a. A sealing ring 27 affords a seal between the body 1 and the nozzle 25. A plug 28 permits access to the interior of the body 1 in front of the inlet 2 for mounting the connection 29 in which the inlet 2 is formed.

The apparatus operates in the following manner:

The inlet 2 is connected to a conduit a supplying fluid A after passage of the latter through a pressure-reducing valve or any other adjustable pressure-regulating means.

The inlet 3 receives the mixture or emulsion (A+B) from the discharge b of a pressure limiter R of the displacement pump P.

The inlet 4 receives the fluid B at stable low or zero pressure.

The fluid A reaches, by way of the chamber 6 and the passages 6 and 7 and after having shifted from its seating the ball 10 (which is normally maintained in the closing position by the spring 11), the injector 18 and enters by way of the calibrated orifices 20 the conical passage 21 where the fluid A is added to the mixture (A+B) whose flow is variable. The new mixture A+(A+B) flows through the constriction constituted by the annular space 21. The pressure drop resulting from this constriction is a function of the flow rate of the mixture and results in pressure variations in the passage 21 which act as a counterpressure on the injector 18 whose flow rate therefore varies in the desired manner. The magnitude of the pressure variation in the annular passage 21 can be regulated by modifying the section of the constriction. For this purpose the injector carrier 8 is adjusted by turning it in the nut 12 fixing it to the body 1 and this shifts the injector 18 axially with respect to the nozzle 22 which is fixed in position. The locknut 13 locks the injector carrier 8 in position after adjustment.

The nozzle 22 therefore receives an already intimate mixture of the fluid and the mixture (A+B) and it discharges this intimate mixture at 24 into the center of the frustoconical cavity which is defined by the convergent nozzle 25 and receives the fluid B from the chamber 26 and the inlet 4. Penetration of the hollow conical stream of fluid B in the solid stream of the mixture A + (A+B) produces the final mixture (A+B) which is conveyed to the suction side or inlet of the pump P.

The ball 10, biased by the force of the very weak spring 11, precludes passage of the fluid B OR (A+B) into the chamber 5 should the pressure in the latter drop accidentally.

The screw-threaded connection 29 permits the direct attachment to the body 1 of the apparatus I of a cutoff valve (magnetic or manual) for the supply of fluid A. Access to the hexagonal head of this connection is possible with the aid of a box spanner after having removed the plug 28 and withdrawn the injector carrier 8 by unscrewing the nut 12.

Without departing from the scope of the invention, modifications could be made to this apparatus, principally when it is required to afford high precision in the stability or evolution of the proportions of the two fluids in the mixture when the variation in the flow of utilization is very high.

An apparatus II constituting such a modification is shown in FIG. 2 in which the section of the outlet of the variable-pressure chamber 17 is defined by the combination of a needle valve 30, integral with the injector 18a of the fluid A, and the nozzle of a piston 31 which is slidable in a tubular member 32 and subjected to the axial thrust of a spring 33. Variation in the flow of the fluid (A+B) results in a displacement of the piston 31 towards a position of equilibrium in which the pressure due to the pressure drop resulting from the new section of the passage between the piston 31 and the needle valve 30 balances the new thrust of the spring 33. The shape of the needle valve 30 can be arranged in such manner as a function of the stress in the spring 33 that the variation in the section of the passage produces, for each instantaneous flow of the fluid (A+B) at inlet 3, the required force of the spring 33 and consequently the required pressure of the fluid (A+B). The initial rating or stress of the spring can be regulated by the axial adjustment of the needle valve 30. It will be observed that, in this embodiment, the aforementioned regulation can be effected by modifying the pressure of the fluid B, the resultant axial force of which is superimposed on the force of the spring 33 acting on the piston 31.

The arrival of the mixture (A+B) from the inlet 3 concentrically with the fluid A results in the mixture A+ (A+B) to which mixture the fluid B flowing from the inlet 4 into the tubular member 32 is added also concentrically.

In this embodiment, the mixtures are effected inside the tubular member 32 which carries the injector carrier 8a. The member 32 extends through the body 1a and inlet ports 34, 35, 36 formed in this member are respectively in facing relation to the three inlets 2, 3 and 4. The outlet end portion 26a of the member 32 has a male screwthread 37 which can be directly screwed into the inlet aperture of the body of the pump. The tightening of the member 32 locks the apparatus to the body of the pump in any desired position. A sealed assembly is ensured by a sealing element 38 between the head of the member 32 and the body 1a and a sealing element 39 between the body 1a and the pump (not shown).

The interest of the member 32 will be understood, this member avoiding any connecting union and rendering the assembly or disassembly of the apparatus very simple. It will be clear that the member 32, whose function is to simplify the mounting and maintenance of the apparatus, does not modify in any way the principle of operation of the apparatus.

With reference now to FIG. 3, there is shown an example of an application of the invention to a process of gasification of liquid fuels by putting the fuels into emulsion with water. Combustion of this emulsion can thereafter occur in a conventional or specialized burner employing a mechanical spraying system and having a variable flow.

The beneficial effects of such an application as concerns atmospheric pollution due to elimination of unburnt solids are known. However, this application can only give satisfaction if the constancy of proportions of water and fuel is correctly ensured for all burner flow rates and if the dosage or metering of the water in the mixture is very strict and perfectly reliable for a given regulation. Further, it is important that application of the process to a conventional burner does not result in equipment costs and mounting costs which are out of proportion with the value of the burner and, moreover, that the overall size of the equipment to adapt does not present a technical or even an aesthetic difficulty. The apparatus according to the invention here affords a most fortunate solution, it having the required qualities as concerns metering, mixing and regulation and allowing its incorporation in the burner usually with no difficulty by the direct adaptation of the body of the apparatus on the pump.

FIG. 3 shows a burner 14 having two speeds or rates, ensured by two jets 41 and 42 which operate separately or simultaneously. The pump P of the burner receives the apparatus I according to the invention directly in the inlet orifice of the pump. The inlet 2 of the apparatus is connected to a supply line 45 of water A through a magnetic cutoff valve 43 directly fixed to the body of the apparatus 1 and a pressure reducing valve 44. The inlet 4 is connected to the line 45 supplying the fuel B at low pressure to the burner. The inlet 3 is connected to the discharge chamber of the pressure limiter R of the pump P. If the pump P cannot itself effect the emulsion of the mixture supplied by the apparatus I, the pump delivers the mixture to an emulsifier 47 whose outlet is connected to the jet carrier 40 by a line by-passing the pressure limiter R.

In the chart shown in FIG. 4, it can be seen that for a flow D of fuel ranging between 46 and 140 liters/hour, namely roughly in the ratio of 1—3, the corresponding flow of water $d$ follows a curve Z representing a practically constant percentage of water in the emulsion (30.5 percent), the deviations being less than ± 1.5 percent. The pressure of injection of the water is 2.4 bars. The curve Y represents variations in the pressure of the returns (A+B) as a function of D.

The invention has many advantages, among which might be mentioned:

No pressure drops at the intake of the pump P at the inlet of the fluid B and consequently no risk of cavitation of the pump.

Direct action of a pressure variation of large magnitude on a single one of the fluids to be metered or dosed, namely fluid A, whence an interesting simplicity and high reliability.

Instantaneous regulation of the flow of the fluid A, which is effected by a pressure variation upstream of a calibrated orifice 43, whence a very high metering or dosage precision if the injector is of a type which results in only a slight flow variation for a large pressure variation.

Concentric arrivals of the fluids resulting in a very fine and very homogeneous mixture.

Very small size of the apparatus enabling it to be directly adapted to the body of the pump P (FIG. 3), which dispenses with any connecting piping in which deposits might occur and affect the quality of the mixture and consequently of the emulsion.

Possibility of carrying out maintenance of the apparatus without modifying the adjustments.

Safety precaution precluding the introduction of the fluid B or of the mixture (A+B) in the line supplying the fluid A owing to an accidental pressure drop in the latter.

Simple design of the apparatus, resulting in low cost. Note that the apparatus is applicable to the regulation of the flow of a burner of the modulating type having variable-flow jets.

Having now described my invention what I claim and desire to secure by Letters Patent is:

1. A process for metering or dosing a mixture of a first fluid (A) and a second fluid (B) under pressure for supplying said mixture to a positive displacement pump provided with a pressure limiter which discharges a part of said mixture (A+B), said process comprising injecting the first fluid (A) under pressure in a fraction of the mixture (A+B) discharged from said pressure limiter, the flow rate variations of the mixture (A+B), which are complementary to the flow variations of utilization downstream of the pump, producing pressure variations which act as counterpressure on the injection of the fluid (A), whereby it is possible to ensure the constancy of the proportionality of the two fluids (A) and (B) in the final mixture (A+B), which is obtained by injection of the mixture (A) + (A+B) in a supply of the second fluid (B), irrespective of the flow of utilization of said final mixture.

2. A process as claimed in claim 1, comprising injecting the first fluid (A) into a thin convergent frustoconical stream of said fraction of the mixture (A+B) discharged from the pressure limiter.

3. A process as claimed in claim 1, comprising injecting the mixture (A) + (A+B) into a convergent frustoconical stream of the second fluid (B) under pressure.

4. An automatic apparatus for metering or dosing and mixing a first fluid (A) and a second fluid (B) and supplying the mixture (A+B) to a positive displacement pump having a pressure limiter which discharges through an exhaust aperture a part of said mixture (A+B), said apparatus comprising a body and, in the body, a first inlet for the first fluid (A) and an outlet, a second chamber having a second inlet for connection to said pressure limiter exhaust aperture for receiving said part of the mixture (A+B) and an outlet, a third chamber having a third inlet for said fluid (B) and an outlet, a first injector for injecting the first fluid (A) into a convergent frustoconical stream of said mixture of fluids (A+B) at the outlet of the second chamber and a second injector for injecting the mixture (A) + (A+B) obtained in the second chamber into a convergent stream of the second fluid (B) at the outlet of the third chamber.

5. An apparatus as claimed in claim 4, comprising an axial injector for the first fluid (A), an axial frustoconical injector for the second fluid (B), and a coaxial frustoconical inlet for a fraction of the mixture (A+B) under variable pressure.

6. An apparatus as claimed in claim 4, wherein the first injector is capable of being removed and interchanged and is combined with axial screw means whereby it is mounted in said body, it being possible to modify the axial position of the first injector with respect to the body by screwing said screw means.

7. An apparatus as claimed in claim 4, comprising an injector carrier for the first injector and a check-valve arrangement in the carrier precluding accidental introduction of the second fluid (B) or of the mixture (A+B) into the first fluid (A).

8. An apparatus as claimed in claim 4, comprising a hollow cylindrical member mounted inside the body and provided with ports facing respectively each of said fluid inlets, said member carrying all the fluid injecting means and permitting a direct connection to the pump.

9. A system for supplying an apparatus, such as a burner, with a mixture of a first fluid (A) and a second fluid (B), said system comprising a source of fluid (A) and a source of fluid (B), a positive displacement pump having an inlet and an outlet, a conduit connecting the pump outlet to the apparatus, a pressure limiter having an exhaust aperture and communicating with the pump outlet for limiting the pressure of the fluid in said conduit, and an apparatus for metering and mixing the first fluid (A) and the second fluid (B), said apparatus comprising a body and, in the body: a first chamber having an outlet and a first inlet which is connected to said source of fluid (A), a second chamber having an outlet and an inlet which is connected to said exhaust aperture of the pressure limiter for receiving a part of the mixture (A+B) from the pressure limiter, a third chamber having an outlet and an inlet which is connected to said source of fluid (B), a first injector for injecting the first fluid (A) into a convergent frustoconical stream of the mixture of fluids (A+B) at said outlet of the second chamber and a second injector for injecting the mixture (A) + (A+B) obtained in the second chamber into a convergent stream of the second fluid (B) at said outlet of the third chamber.

* * * * *